(12) United States Patent
Jiang

(10) Patent No.: US 11,564,174 B2
(45) Date of Patent: Jan. 24, 2023

(54) SIDELINK POWER CONTROL METHOD AND TERMINAL DEVICE

(71) Applicant: VIVO MOBILE COMMUNICATION CO., LTD., Guangdong (CN)

(72) Inventor: Wei Jiang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/061,371

(22) Filed: Oct. 1, 2020

(65) Prior Publication Data

US 2021/0022084 A1 Jan. 21, 2021

Related U.S. Application Data

(63) Continuation of application No. PCT/CN2019/082211, filed on Apr. 11, 2019.

(30) Foreign Application Priority Data

Apr. 12, 2018 (CN) .......................... 201810326499.3

(51) Int. Cl.
*H04W 72/04* (2009.01)
*H04W 52/14* (2009.01)
(Continued)

(52) U.S. Cl.
CPC ......... *H04W 52/146* (2013.01); *H04L 1/0026* (2013.01); *H04L 1/1819* (2013.01);
(Continued)

(58) Field of Classification Search
CPC . H04W 52/146; H04W 52/22; H04W 52/225; H04W 52/245; H04W 52/265;
(Continued)

(56) References Cited

U.S. PATENT DOCUMENTS

2010/0265862 A1\* 10/2010 Choi ................... H04W 52/265
370/311
2014/0274196 A1\* 9/2014 Dai ..................... H04W 52/242
455/522
(Continued)

FOREIGN PATENT DOCUMENTS

| CN | 1790939 A | 6/2006 |
| CN | 102083189 A | 6/2011 |

(Continued)

OTHER PUBLICATIONS

European Search Report dated Jul. 23, 2021 as received in application No. 19786105.
(Continued)

*Primary Examiner* — Mahbubul Bar Chowdhury
(74) *Attorney, Agent, or Firm* — Maschoff Brennan

(57) ABSTRACT

This disclosure provides a sidelink power control method and a terminal device. The method is applied to the terminal device, and includes: sending information to a first terminal device in sidelink communication, so that the first terminal device generates power control indication information based on a receiving status of the information; receiving the power control indication information from the first terminal device; and determining an information transmit power of the terminal device in the sidelink communication according to the power control indication information.

17 Claims, 4 Drawing Sheets

(51) Int. Cl.
*H04L 1/00* (2006.01)
*H04L 1/18* (2006.01)
*H04L 1/20* (2006.01)
*H04L 5/00* (2006.01)
*H04W 52/24* (2009.01)
*H04W 92/18* (2009.01)

(52) U.S. Cl.
CPC .......... *H04L 1/203* (2013.01); *H04L 5/0055* (2013.01); *H04W 52/241* (2013.01); *H04W 92/18* (2013.01)

(58) Field of Classification Search
CPC ... H04W 52/383; H04W 52/08; H04W 52/16; H04W 52/54; H04W 52/241; H04W 92/18; H04L 1/0026; H04L 1/1819; H04L 1/203; H04L 5/0055
See application file for complete search history.

(56) References Cited

U.S. PATENT DOCUMENTS

| | | | |
|---|---|---|---|
| 2015/0172029 A1 | 6/2015 | Suzuki et al. | |
| 2015/0319705 A1 | 11/2015 | Yoon et al. | |
| 2015/0351044 A1* | 12/2015 | Boudreau | H04W 72/0473 370/329 |
| 2016/0330696 A1 | 11/2016 | Suzuki et al. | |
| 2017/0099689 A1* | 4/2017 | Kalhan | H04W 72/04 |
| 2017/0202041 A1* | 7/2017 | Qin | H04W 76/14 |
| 2017/0347324 A1* | 11/2017 | Yang | H04W 52/245 |
| 2019/0053305 A1* | 2/2019 | Saiwai | H04W 76/11 |
| 2019/0159135 A1* | 5/2019 | MolavianJazi | H04W 52/362 |
| 2019/0174429 A1* | 6/2019 | Wang | H04W 52/242 |
| 2020/0280926 A1* | 9/2020 | Piipponen | H04W 52/367 |
| 2021/0099958 A1* | 4/2021 | Bae | H04W 52/18 |

FOREIGN PATENT DOCUMENTS

| | | |
|---|---|---|
| CN | 102427601 A | 4/2012 |
| CN | 103139889 A | 6/2013 |
| CN | 105323841 A | 2/2016 |
| CN | 105874854 A | 8/2016 |
| EP | 0940933 A2 | 9/1999 |
| EP | 3496470 A1 | 6/2019 |
| WO | 2009061106 A2 | 5/2009 |
| WO | 2014/113424 A1 | 7/2014 |
| WO | 2018027993 A1 | 2/2018 |

OTHER PUBLICATIONS

Written Opinion and International Search Report in Application No. PCT/CN2019/082211 dated Oct. 22, 2020.
"Remaining Details of D2D Link Measurements Procedures" 3GPP TSG-RAN WG1 Meeting #82, R1-154437, Aug. 24, 2015.
"Transmission power control for V2V" 3GPP TSG RAN WG1 #84bis, R1-162683, Apr. 11, 2016.
"Remaining issues on NR UL power control" 3GPP TSG RAN WG1 Meeting #90bis, R1-1717508, Oct. 9, 2017.
CN Office Action in Application No. 201810326499.3 dated Apr. 23, 2020.
Intel Corporation, "On Remaining Details of Power Control," 3GPP TSG RAN WG1 Meeting #79, R1-144653, pp. 1-4, (Nov. 17, 2014).
Nokia et al., "Discussion on sidelink power control," 3GPP TSG-RAN WG1 Meeting #90, R1-1714002, pp. 1-3, (Aug. 20, 2017).
Extended European Search Report dated Apr. 26, 2021 as received in Application No. 19786105.7.

* cited by examiner

SIDELINK POWER CONTROL METHOD AND TERMINAL DEVICE

CROSS-REFERENCE TO RELATED APPLICATIONS

This application is a continuation application of PCT Application No. PCT/CN2019/082211 filed on Apr. 11, 2019, which claims priority to Chinese Patent Application No. 201810326499.3 in China on Apr. 12, 2018, disclosure of which are incorporated herein by reference in their entirety.

TECHNICAL FIELD

This disclosure relates to the field of communications technologies, and in particular, to a sidelink power control method and a terminal device.

BACKGROUND

In fifth generation (5G) mobile communication and subsequent evolved wireless network communication, sidelink communication usually has a power control mechanism. With the power control mechanism, transmit power of an information sending terminal in the sidelink communication can be adjusted, so that a relatively good reception effect can be always maintained for an information receiving terminal in the sidelink communication.

Generally, the power control mechanism of the sidelink communication is implemented by using an open-loop power control mechanism in the sidelink communication. Currently, open-loop power control for the sidelink communication may be implemented based on an open-loop power control method in Long Term Evolution (LTE). That is, the transmit power of the terminal device in the sidelink communication can be controlled in a centralized manner by using path loss (that is, Pathloss) between the terminal device and a network-side device. Specifically, the information sending terminal may calculate a basic open-loop operation point based on a static parameter or a semi-static parameter delivered by the network-side device, and may determine, based on the obtained basic open-loop operation point, the transmit power of the information sending terminal in the sidelink communication.

Open-loop power control for the sidelink communication can be implemented in the foregoing manner; however, with open-loop power control for the sidelink communication, a relatively good information reception effect cannot be always ensured for the information receiving terminal in the sidelink communication, and power control in the sidelink communication features poor accuracy, resulting in power wastes and deteriorated overall performance of the communication system. Therefore, in 5G and subsequent evolved wireless network communication, a more optimized or reliable power control scheme needs to be provided for the sidelink communication.

SUMMARY

According to a first aspect, a sidelink power control method is provided and applied to a terminal device. The method includes:

sending information to a first terminal device in sidelink communication, so that the first terminal device generates power control indication information based on a receiving status of the information;

receiving the power control indication information from the first terminal device; and determining an information transmit power of the terminal device in the sidelink communication according to the power control indication information.

According to a second aspect, a sidelink power control method is provided and applied to a terminal device. The method includes:

receiving information from a second terminal device in sidelink communication; and sending power control indication information to the second terminal device based on a receiving status of the information, so that the second terminal device determines an information transmit power of the second terminal device in the sidelink communication according to the power control indication information.

According to a third aspect, a terminal device is provided and includes:

an information sending module, configured to send information to a first terminal device in sidelink communication, so that the first terminal device generates power control indication information based on a receiving status of the information;

an information receiving module, configured to receive the power control indication information from the first terminal device; and a power adjustment module, configured to determine an information transmit power of the terminal device in the sidelink communication according to the power control indication information.

According to a fourth aspect, a terminal device is provided and includes:

an information receiving module, configured to receive information from a second terminal device in sidelink communication, where the second terminal device is an information sending terminal in the sidelink communication; and an information sending module, configured to send power control indication information to the second terminal device based on a receiving status of the information, so that the second terminal device determines an information transmit power of the second terminal device in the sidelink communication according to the power control indication information.

According to a fifth aspect, a terminal device is provided and includes a memory, a processor, and a program stored in the memory and configured to run on the processor, where when the computer program is executed by the processor, the steps of the method according to the first aspect are implemented.

According to a sixth aspect, a terminal device is provided and includes a memory, a processor, and a program stored in the memory and configured to run on the processor, where when the computer program is executed by the processor, the steps of the method according to the second aspect are implemented.

According to a seventh aspect, a computer-readable storage medium is provided, where a program is stored in the computer-readable storage medium; and when the computer program is executed by a processor, the steps of the method according to the first aspect or the second aspect are implemented.

BRIEF DESCRIPTION OF DRAWINGS

To describe the technical solutions in the embodiments of this disclosure or in the related art more clearly, the following briefly describes the accompanying drawings required for describing the embodiments or the related art. Apparently, the accompanying drawings in the following description show merely some embodiments recorded in this disclosure, and a person of ordinary skill in the art may still derive other drawings from these accompanying drawings without creative efforts.

DESCRIPTION OF EMBODIMENTS

To make a person skilled in the art understand the technical solutions in this disclosure better, the following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure without creative efforts shall fall within the protection scope of this disclosure. Use of "and/or" in the specification and claims represents at least one of connected objects.

The embodiments of this disclosure provide a sidelink power control method and a terminal device. The technical solutions of this disclosure may be applied to various communications systems, such as a Global System of Mobile communication (GSM), a Code Division Multiple Access (CDMA) system, a Wideband Code Division Multiple Access (WCDMA) system, a general packet radio service (GPRS) system, and a Long Term Evolution (LTE) system.

User equipment (UE) may also be referred to as a mobile terminal, an access terminal, a subscriber unit, a subscriber station, a mobile station, a mobile, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modem, an in-vehicle device, a wearable device, a terminal device in a future 5G network, or a terminal device in a future evolved Public Land Mobile Network (PLMN) network.

A network-side device may be a device used to communicate with a mobile device. The network-side device may be a base transceiver station (BTS) in GSM or CDMA, or may be a NodeB (NB) in WCDMA, or may be an evolved NodeB (eNB, or eNodeB) or an access point in LTE, or an in-vehicle device, a wearable device, a network-side device in a future 5G network, or a network-side device in a future Public Land Mobile Network (PLMN) network.

A system to which this disclosure is applied may be a frequency division duplex (FDD) system, a time division duplex (TDD) system, or a system in which FDD and TDD are aggregated. This is not limited by this disclosure.

A sidelink in the sidelink power control method and the terminal device provided in this disclosure may be also referred to a secondary link, a bylink, or a bypass.

Figure 1:
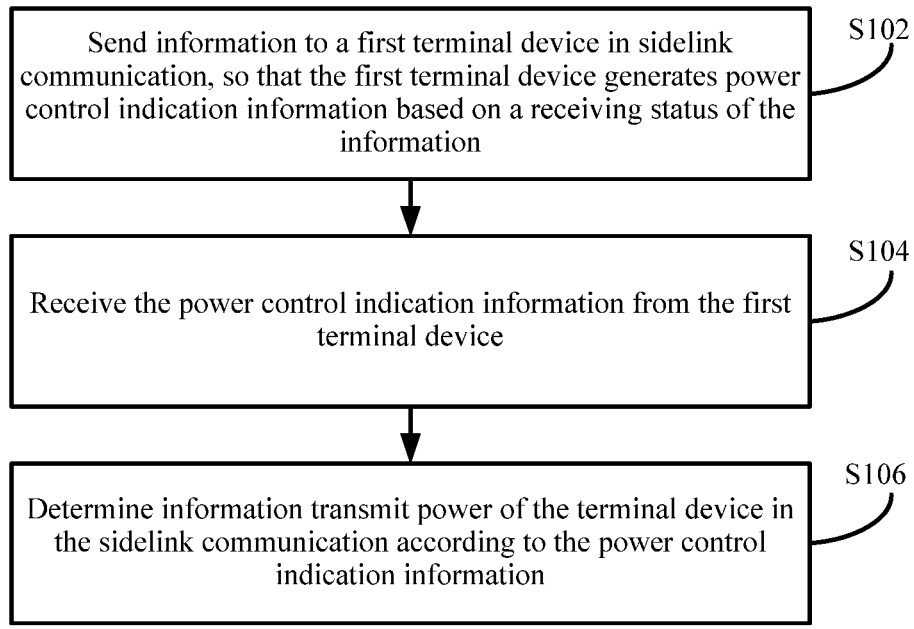
FIG. 1 is an embodiment of a sidelink power control method according to this disclosure.

As shown in FIG. 1, an embodiment of this disclosure provides a sidelink power control method. The method may be applied to transmit power control processing for sidelink communication. The method may be executed by user equipment. The user equipment may be a terminal device. The terminal device may be a mobile terminal device such as a mobile phone, a tablet computer, or a wearable device. The terminal device may alternatively be a terminal device such as a personal computer, and the terminal device may be a terminal device used for information sending in the sidelink communication. The method may specifically include steps S102 to S106.

In S102, information is sent to a first terminal device in the sidelink communication, so that the first terminal device generates power control indication information based on a receiving status of the information;

In S104, the power control indication information is received from the first terminal device.

The first terminal device may be an individual independent terminal device, or may be a plurality of terminal devices. In other words, there may be a plurality of terminal devices used for information receiving in the sidelink communication. The power control indication information may be information used to instruct the information sending terminal in the sidelink communication whether to adjust a transmit power of the information sending terminal. The power control indication information may include related information able to instruct to adjust or control the transmit power of the terminal device in the sidelink communication. The power control indication information may include not only information about whether to adjust the transmit power, but also information about how to adjust the transmit power, for example, to increase or decrease the transmit power, and may also include information such as how much to be adjusted of the transmit power, such as 0.5 mW or 1 mW. It should be noted that in actual application, the power control indication information is not merely used to indicate whether to adjust the transmit power. The power control indication information may also have other usage or functions, such as determining signal quality or determining noise in a signal. This is not limited in this embodiment of this disclosure.

In implementation, for processing of the foregoing S102 and S104, in 5G or subsequent evolved wireless network communication, open-loop power control in the sidelink communication may be implemented based on an open-loop power control method in Long Term Evolution (LTE). That is, the transmit power of the terminal device in the sidelink communication can be controlled in a centralized manner by using path loss (that is, Pathloss) between the terminal device and the network-side device. The open-loop power control may be a power control manner in which a sender can determine and control a transmit power of the sender, not requiring a receiver to feed back a receiving status of the information. Specifically, the terminal device (that is, the sender) calculates a basic open-loop operation point based on a static parameter or a semi-static parameter delivered by the network-side device. The basic open-loop operation point may be divided into two parts: (1) a target value $P_0$, indicated by a semi-static parameter, of open-loop power of the terminal device; and (2) an open-loop path loss compensation component. The open-loop path loss compensation component may be determined by an estimation value PL of downlink path loss of the terminal device and a path loss compensation factor $\alpha$ delivered by the network-side device. Therefore, the basic open-loop operation point may be: Open-loop operation point=$P_0$+$\alpha \times$PL In the sidelink communication, for the information sending terminal device corresponding to a plurality of information receiving user equipments (that is, the first terminal device), there is only one power control process for the terminal device that is used to send information. The power control process is capable of implementing open-loop power control. A basic formula for open-loop power control for the sidelink communication can be expressed as a formula (1).

$$P = \min\left\{ \begin{array}{l} P_{CMAX} \\ P_0 + 10\log_{10}(M) + \alpha g PL \end{array} \right\}, \quad (1)$$

where $P_{CMAX}$ is a maximum transmit power of the terminal device, M may be an allocated bandwidth (M may be in RBs), PL may be a measured path loss value of a serving cell, and $P_0$ and $\alpha$ may be indicated by higher-layer parameters of $P_0$ and alpha, corresponding to an open-loop power target value and a compensation factor of power loss of the terminal device on the physical sidelink shared channel (PSSCH), respectively.

In the foregoing manner, open-loop power control for the sidelink communication in 5G or subsequent evolved wireless network communication can be implemented based on open-loop power control in LTE. However, closed-loop power control for the sidelink communication has not been implemented. Closed-loop power control has an unparalleled advantage over open-loop power control, for example, being more accurate in power control, and therefore closed-loop power control for the sidelink communication is a necessity for 5G or evolved wireless network communication. How to implement closed-loop power control for the sidelink communication is a problem to be resolved. This embodiment of this disclosure provides a mechanism for implementing closed-loop power control for the sidelink communication. In this embodiment of this disclosure, closed-loop power control may be introduced on a basis of open-loop power control for the sidelink communication to implement further power control. Specific processing may include the following content:

Closed-loop power control may be a power control mode that a sender controls a transmit power according to power control indication information sent by a receiver. In a processing process of closed-loop power control, a feedback control loop is required in the sidelink communication, and signal quality of a received signal is compared with expected signal quality, so as to provide the terminal device with the power control indication information indicating whether to increase or decrease the transmit power. The power control indication information may be implemented by using a command in wireless network communication, such as a transmit power control (TPC) command. The terminal device may execute the TPC command to adjust the transmit power in sidelink communication.

Figure 2:
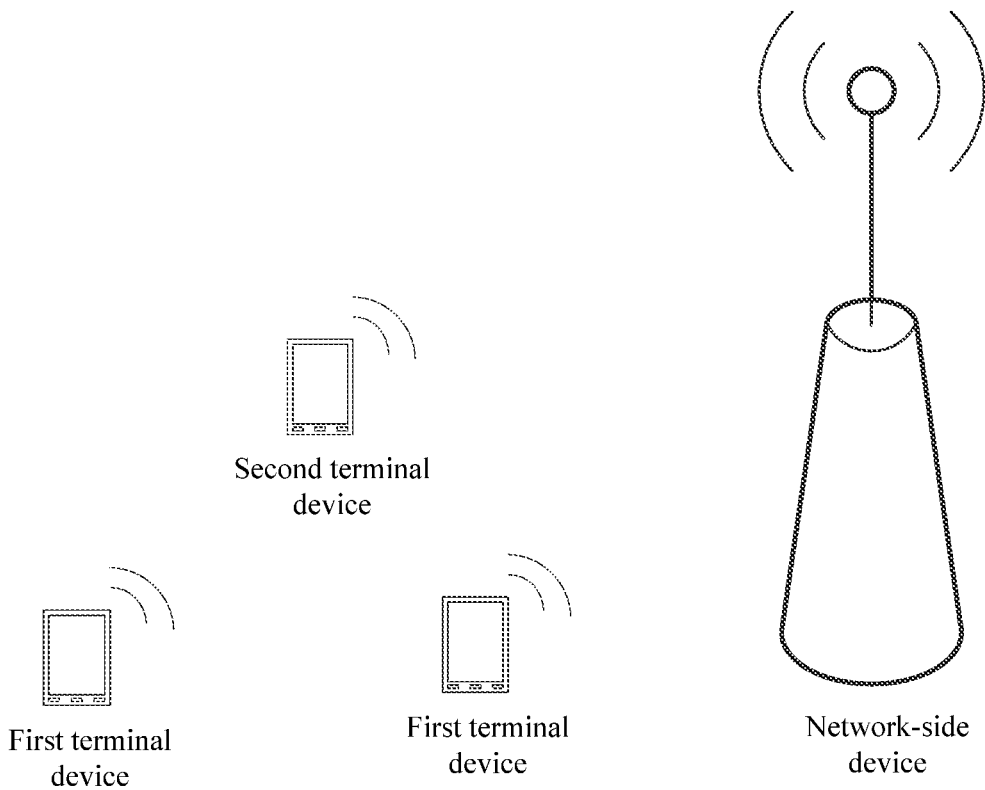
FIG. 2 is a schematic structural diagram of a sidelink power control system according to this disclosure.

Specifically, as shown in FIG. 2, the sidelink communication may include a terminal device used for information sending, and one or more first terminal devices used for information receiving. An information transmit power may be preset in the terminal device. The information transmit power may be obtained through open-loop power control for the sidelink communication, or may be obtained in another manner (for example, according to a preset protocol or based on higher-layer configuration information). When a preset detection period of the transmit power elapses or the transmit power in the sidelink communication needs to be adjusted, the terminal device may send information or an information feedback request to the first terminal device through the network-side device. After receiving the information or the information feedback request, the first terminal device may collect, based on the receiving status of the information (for example, whether the information is not received due to an excessive low transmit power, or whether the information is not received due to a system failure of the first terminal device), related information about signal quality of the signal received by the first terminal device; may process the related information to obtain processed information; and may generate the power control indication information based on the processed information. The first terminal device may send the power control indication information to the terminal device, and the terminal device may receive the power control indication information sent by the first terminal device.

In S106, the information transmit power of the terminal device in the sidelink communication is determined according to the power control indication information.

A sidelink may transmit a signal or information through a radio frame. One subframe of the sidelink may include two consecutive timeslots and may start with an even-numbered timeslot.

In implementation, a threshold or an expected value of signal quality of the signal sent by the terminal device can be pre-configured by using a corresponding communications protocol or in a manner of an agreement between devices. After receiving the power control indication information sent by the first terminal device, the terminal device may analyze the power control indication information, and extract or calculate the related information about the signal quality of the signal received by the first terminal device; then, may compare the extracted or calculated information with the pre-configured threshold or expected value of the signal quality, and may determine, based on a comparison result, whether to increase the information transmit power of the terminal device (the information sending terminal) in the sidelink communication or to decrease the information transmit power of the terminal device (the information sending terminal) in the sidelink communication, or directly determine the information transmit power of the terminal device (the information sending terminal) in the sidelink communication based on the comparison result.

For example, in different cases that may possibly exist in the sidelink communication, a plurality of different thresholds or expected values of signal quality may be configured, for example, two, three or four thresholds or expected values. Configuration of two thresholds or expected values of signal quality is used as an example, and may be specifically as follows: The two thresholds or expected values of signal quality may be K1 and K2, and K1<K2. If the signal quality is less than or equal to K1, the information transmit power of the terminal device (information sending terminal) in the sidelink communication is 1 dBm. If the signal quality is greater than K1 and less than K2, the information transmit power of the terminal device in the sidelink communication is 2 dBm. If the signal quality is greater than or equal to K2, the information transmit power of the terminal device in the sidelink communication is 4 dBm. Therefore, when receiving the power control indication information, the terminal device may determine, according to the power control indication information, the signal quality of the signal received by the first terminal device, and determine the information transmit power of the terminal device in the sidelink communication by determining a position of the signal quality in the foregoing range. For example, if the signal quality determined according to the power control indication information is greater than K1 and less than K2, the information transmit power of the terminal device may be then set to 2 dBm. In this case, the terminal device may send information or a signal at the transmit power of 2 dBm.

This embodiment of this disclosure provides a sidelink power control method, applied to a terminal device. The terminal device may be an information sending terminal in the sidelink communication, and receives the power control indication information sent by the first terminal device acting as the information receiving terminal in the sidelink communication, so as to determine the information transmit power of the terminal device (that is, the information sending terminal) in the sidelink communication. In this way, the terminal device can perform closed-loop power control by using the power control indication information in the sidelink communication, so as to further adjust the transmit power of the information sending terminal in the sidelink communication. This can always ensure a relatively good reception effect for the first terminal device to receive information or a signal sent by the information sending terminal, thereby reducing power wastes and improving overall performance of the communications system.

Figure 3:
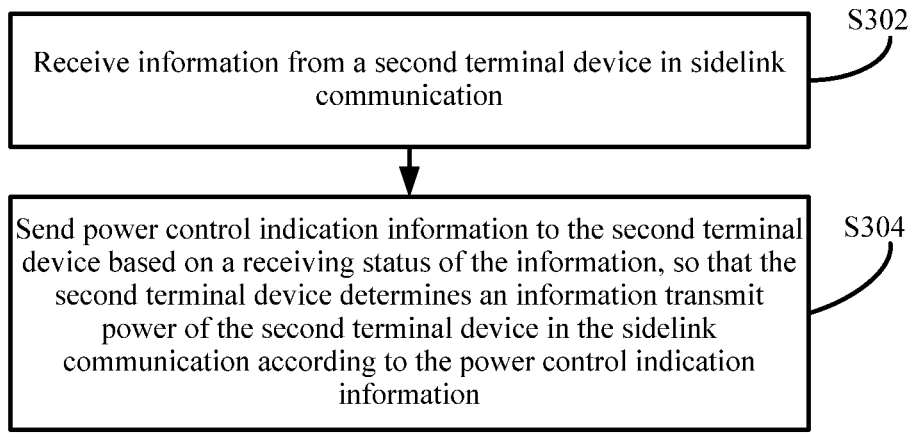
FIG. 3 is another embodiment of a sidelink power control method according to this disclosure.

As shown in FIG. 3, another embodiment of this disclosure provides a sidelink power control method. The method may be applied to closed-loop power control processing of sidelink communication. The method may be executed by user equipment. The user equipment may be a terminal device. The terminal device may be a mobile terminal device such as a mobile phone, a tablet computer, or a wearable device. The terminal device may alternatively be a terminal device such as a personal computer, and the terminal device may be the first terminal device in the foregoing embodiment of FIG. 1, that is, may be a terminal device used for information sending in the sidelink communication. The method may specifically include steps S302 to S304.

In 302, information is received from a second terminal device in the sidelink communication.

The second terminal device may be the terminal device in the foregoing embodiment of FIG. 1. To distinguish from the first terminal device in FIG. 1, in this embodiment, the terminal device used for information receiving is the first terminal device, and the terminal device used for information sending may be the second terminal device. In actual application, one terminal device may be in different sidelink communication. However, there is only one transmit power for each terminal device. Power control indication information may include not only information about whether to adjust a transmit power, but also information about how to adjust the transmit power, for example, to increase or decrease the transmit power, and may also include information such as how much to be adjusted of the transmit power and the like.

In implementation, as shown in FIG. 2, the sidelink communication may include the second terminal device used for information sending, and one or more first terminal devices used for information receiving. An information transmit power may be preset in the second terminal device. The information transmit power may be obtained through open-loop power control for the sidelink communication, or may be obtained in another manner (for example, according to a preset protocol or based on higher-layer configuration information). When a preset detection period of the transmit power elapses or the transmit power of the second terminal device in the sidelink communication needs to be adjusted, the second terminal device may send information to the first terminal device based on the preset information transmit power through the network-side device.

In S304, the power control indication information is sent to the second terminal device based on a receiving status of the information, so that the second terminal device determines the information transmit power of the second terminal device in the sidelink communication according to the power control indication information.

In implementation, the first terminal device may collect, based on the receiving status of the information, related information about signal quality of a signal received by the first terminal device, and may generate the power control indication information (it should be noted that the power control indication information may reflect the receiving status of the information of the first terminal device) based on the foregoing information. The first terminal device may send the power control indication information to the second terminal device. The second terminal device may determine, according to the power control indication information, the information transmit power of the second terminal device (that is, the information sending terminal in the sidelink communication) in the sidelink communication. For a specific processing process, reference may be made to related content in the foregoing S104, and details are not described herein again.

This embodiment of this disclosure provides a sidelink power control method, applied to a terminal device. The terminal device may be an information receiving terminal in the sidelink communication, and sends the power control indication information to the second terminal device acting as the information sending terminal in the sidelink communication, so that the second terminal device determines the information transmit power of the information sending terminal in the sidelink communication. In this way, the terminal device can perform closed-loop power control by using the power control indication information in the sidelink communication, so as to further adjust the transmit power of the information sending terminal in the sidelink communication. This can always ensure a relatively good reception effect for the first terminal device to receive information or a signal sent by the information sending terminal, thereby reducing power wastes and improving overall performance of the communications system.

Figure 4:
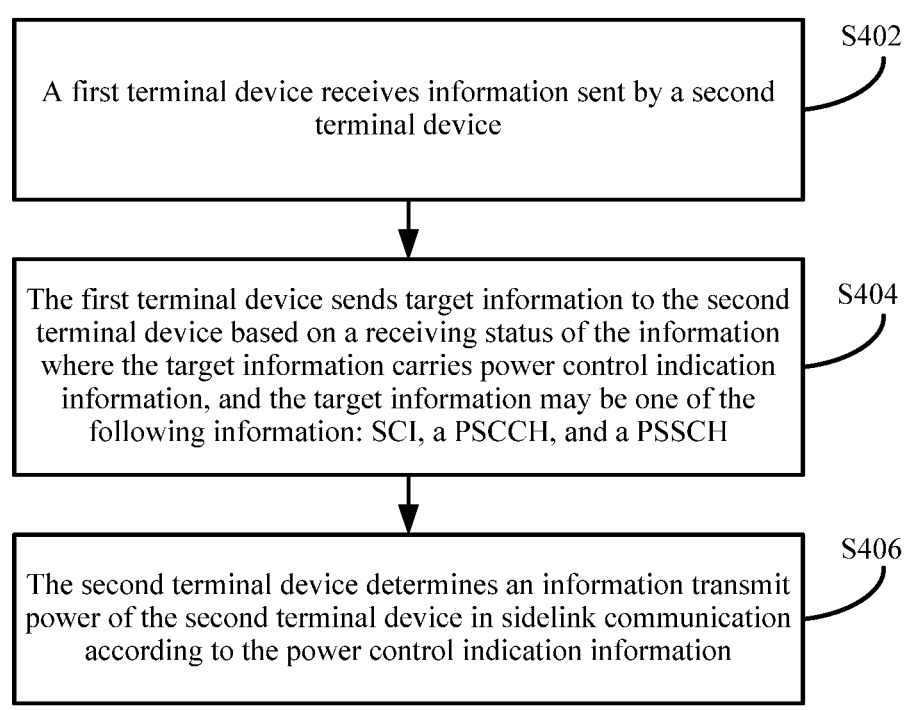
FIG. 4 is still another embodiment of a sidelink power control method according to this disclosure.

As shown in FIG. 4, another embodiment of this disclosure provides a sidelink power control method. The method may be applied to closed-loop power control processing of sidelink communication. The method may be executed by user equipment. The user equipment may be a terminal device, the terminal device may be a mobile terminal device such as a mobile phone, a tablet computer, or a wearable device, and the terminal device may also be a terminal device such as a personal computer. The terminal device, as an execution body in this embodiment, may include the first terminal device in the foregoing embodiment shown in FIG. 1, that is, may be the terminal device used for information receiving in the sidelink communication, and the second terminal device in the foregoing embodiment shown in FIG. 2, that is, the terminal device used for information sending in the sidelink communication. The method may specifically include steps S402 to S406.

In S402, the first terminal device receives information from the second terminal device.

For a specific processing process of S402, reference may be made to related content in S104, S302, and S304 in the foregoing embodiments shown in FIG. 1 and FIG. 3. Details are not described herein again.

In S404, the first terminal device sends target information to the second terminal device based on a receiving status of the information. The target information carries the power control indication information, and the target information may be one of the following information: sidelink control information SCI, a physical sidelink control channel PSCCH, and a physical sidelink shared channel PSSCH.

The target information may be information that carries the power control indication information, and may include any one of sidelink control information (SCI), a physical sidelink control channel (PSCCH), and a physical sidelink shared channel (PSSCH). In actual application, the target information is not limited to the foregoing three types, and may further include a plurality of types. This is not limited in this embodiment of this disclosure. The power control indication information may include one or a combination of the following: a hybrid automatic repeat request acknowledgment (HARQ ACK)/hybrid automatic repeat request negative acknowledgment (HARQ NACK), a channel quality indicator (CQI), a signal-to-noise ratio (SINR), and a block error ratio (BLER). In actual application, content included in the power control indication information is not limited to the foregoing four types, and may also include a plurality of types, which may be specifically set based on an actual condition. This is not limited in this embodiment of this disclosure.

In implementation, the first terminal device may collect, based on a receiving status of the information, one or more pieces of information of the first terminal device: the signal quality information indicator CQI, the signal-to-noise ratio SINR, the block error rate BLER, and the hybrid automatic repeat request acknowledgment/negative acknowledgment HARQ ACK/NACK; may generate the power control indication information based on the collected information; and may include the power control indication information in the SCI, PSCCH or PSSCH, and send the power control indication information to the second terminal device by using the SCI, PSCCH or PSSCH.

In S406, the second terminal device determines the information transmit power of the second terminal device in the sidelink communication according to the power control indication information.

In implementation, after receiving the power control indication information sent by the first terminal device, the second terminal device may determine, based on the information in the power control indication information (that is, one or more pieces of information in the CQI, SINR, BLER and HARQ ACK/NACK), whether to adjust the information transmit power of the second terminal device in the sidelink communication. If adjustment is not required, processing in the foregoing S402 to S406 may be cyclically performed. If adjustment is required, a magnitude of transmit power adjustment for the second terminal device may be determined according to the power control indication information, so as to adjust the transmit power of the second terminal device based on the determined magnitude, to obtain the adjusted transmit power. In this case, the second terminal device may send information or a signal based on the adjusted transmit power. For a specific processing process, reference may also be made to related content of S104.

In actual application, in different cases, the information transmit power of the second terminal device in the sidelink communication may be determined in different manners. The following provides three optional processing manners, which may specifically include the following content:

Manner 1: Determine the information transmit power of the second terminal device in the sidelink communication based on a quantity of pieces of the received power control indication information and a total quantity of the second terminal devices and the first terminal devices.

In implementation, an actual application scenario is used as an example. For example, in a vehicle queue (that is, Platooning) scenario, if the vehicle queue includes six vehicles, a terminal device used for information sending and receiving is disposed in each vehicle, and the six vehicles may include a first vehicle. The first vehicle may be the front vehicle (which may also be referred to as a head vehicle) in the vehicle queue, or may be the last vehicle in the vehicle queue, or may be a vehicle between the front vehicle and the last vehicle. If all terminal devices in the six vehicles are in the same sidelink communication, an initial information transmit power (the initial transmit power may be obtained by means of open-loop power control for the sidelink communication or obtained in another manner (for example, according to a preset protocol or based on higher-layer configuration information)) for the sidelink communication may be preset in the terminal device (that is, the second terminal device) of the first vehicle. In this case, the first vehicle may send information to another vehicle by using the terminal device of the first vehicle. If the information can be correctly received by the another vehicle, one piece of power control indication information (or may be referred to as response information) may be fed back to the first vehicle. If the first vehicle receives three pieces of power control indication information in total, the information transmit power of the second terminal device (that is, the first vehicle) in the sidelink communication may be calculated by using the three pieces of power control indication information and a total quantity of vehicles in the vehicle queue (that is, the total quantity of the second terminal devices and the first terminal devices (that is, the terminal devices in the vehicles other than the first vehicle). For example, an expression of the transmit power may be f=XdBm*N, where N is a quantity obtained by subtracting, from the total quantity of vehicles in the vehicle queue, the quantity of pieces of the power control indication information received by the first vehicle, and X may be a fixed value, specifically, the value may be set based on an actual condition, for example, 1 or 3. Based on the foregoing example, the first vehicle receives three pieces of power control indication information in total, and the total quantity of vehicles in the vehicle queue is 6. In this case, the information transmit power of the second terminal device (that is, the first vehicle) in the sidelink communication is f=3X dBm. In addition, if the first vehicle receives a total of five pieces of power control indication information, the information transmit power of the second terminal device (that is, the first vehicle) in the sidelink communication is f=-X dBm.

The power control indication information may include a plurality of types of information such as the HARQ ACK/NACK, CQI, SINR and BLER, and different information may be processed in different manners. Therefore, the following describes in detail the foregoing cases including different information. For details, reference may be made to the following manner 2 and manner 3.

Manner 2: The power control indication information may include the HARQ ACK/NACK. In this case, processing in S406 may be: determining the information transmit power of the second terminal device in the sidelink communication based on a first threshold and a proportion of the HARQ NACKs to a sum of the HARQ ACKs and HARQ NACKs.

The first threshold may be determined based on higher-layer configuration information, or determined according to a preset protocol, or predefined. The higher-layer configuration information may be of a communications layer higher than the second terminal device in the sidelink communication, which may be specifically a network-side device (such as a base station), or may be another terminal device, or the like. Predefining may be specifying or setting based on an actual condition.

In implementation, the initial information transmit power in the sidelink communication may be preset on the second terminal device in the sidelink communication (the initial transmit power may be obtained by means of open-loop power control for the sidelink communication, or may be obtained in another manner). In this case, the second terminal device may send information to the first terminal device in the side-link communication. After receiving the information, the first terminal device may send a HARQ ACK or HARQ NACK to the second terminal device. The second terminal device may collect statistics about a quantity of received HARQ NACKs, a quantity of received HARQ ACKs, and the sum of HARQ NACKs and HARQ ACKs, and then calculate the proportion of the quantity of HARQ NACKs to the sum of HARQ ACKs and HARQ NACKs, that is, NACK/(NACK+ACK). A first threshold may be preset in the second terminal device. The first threshold may be an expected value, an optimal value, or the like that is determined based on an actual condition. The first threshold may include one value, or may include a plurality of values, for example, two, three, or four values, and a corresponding transmit power calculation method or calculation rule may be separately set based on a quantity of first thresholds. Then, the second terminal device may compare a value of the obtained proportion with the first threshold, and may calculate a corresponding information transmit power of the second terminal device in the sidelink communication by using a corresponding transmit power calculation method or calculation rule.

For example, the first threshold includes two values, which may be Pn1 and Pn2, and the transmit power calculation method or calculation rule may be set as follows: If $Pn2>x\geq Pn1$, the information transmit power of the second terminal device in the sidelink communication is f=1 dBm; if $Pn2\leq x$, the information transmit power of the second terminal device in the sidelink communication is f=3 dBm; if $Pn1>x$, the information transmit power of the second terminal device in the sidelink communication is f=0 dBm, where x represents the proportion of the quantity of HARQ NACKs to the sum of HARQ ACKs and HARQ NACKs. Specifically, if the proportion of the quantity of HARQ NACKs to the sum of HARQ ACKs and HARQ NACKs is x=0.5, Pn1=0.3, and Pn2=0.8, the information transmit power 1 dBm of the second terminal device in the sidelink communication may be obtained by using the foregoing transmit power calculation method or calculation rule.

It should be noted that the foregoing description is merely based on an example in which the first threshold includes two values. In actual application, the first threshold is not limited to a case in which two values are included, and may alternatively include more than two values, which may be specifically set based on an actual condition. This is not limited in this embodiment of this disclosure.

Manner 3: The power control indication information may include the CQI, and processing of S406 may be: determining the information transmit power of the second terminal device in the sidelink communication based on to a magnitude relationship between the CQI and an expected CQI.

The expected CQI may be determined based on higher-layer configuration information, or determined according to a preset protocol, or predefined.

In implementation, the initial information transmit power in the sidelink communication may be preset on the second terminal device in the sidelink communication (the initial transmit power may be obtained by means of open-loop power control for the sidelink communication, or may be obtained in another manner). In this case, the second terminal device may send information to the first terminal device in the side-link communication. After receiving the information, the first terminal device may send CQI information to the second terminal device. After receiving the CQI information, the second terminal device may perform independent closed-loop power control on different resource pools or bandwidth parts (BWP), so as to implement independent power control in the side-link communication. Specifically, the expected CQI may be preset. The expected CQI may be an expected value, an optimal value, or the like that is determined based on an actual condition. The expected CQI may include one value, or may include a plurality of values, for example, two, three, or four values. A corresponding transmit power calculation method or calculation rule may be set based on a quantity of expected CQIs. Then, the second terminal device may compare the obtained CQI information with the expected CQI, and may calculate, based on the comparison result, a corresponding information transmit power of the second terminal device in the sidelink communication by using the corresponding transmit power calculation method or calculation rule.

For example, the expected CQI includes two values, which may be a and b, and the transmit power calculation method or calculation rule may be set as follows: If the received CQI satisfies a specified value range, that is, [a, b], the second terminal device in the sidelink communication does not need to perform closed-loop power control; if the received CQI is less than a, it indicates that the channel quality in the current sidelink communication is poor, and in this case, the transmit power of the second terminal device in the sidelink communication may be properly increased; and if the received CQI is greater than b, it indicates that the channel quality in the current sidelink communication is relatively good, and in this case, the transmit power of the second terminal device in the sidelink communication may be properly decreased.

It should be noted that the foregoing description is merely based on an example in which the expected CQI includes two values. In actual application, the expected CQI is not limited to a case in which two values are included, and may alternatively include more than two values, which may be specifically set based on an actual condition. This is not limited in this embodiment of this disclosure.

This embodiment of this disclosure provides a sidelink power control method, applied to a terminal device. The terminal device may be an information sending terminal in the sidelink communication, and receives the power control indication information sent by the first terminal device acting as the information receiving terminal in the sidelink communication, so as to determine the information transmit power of the terminal device (that is, the information sending terminal) in the sidelink communication. In this way, the terminal device can perform closed-loop power control by using the power control indication information in the sidelink communication, so as to further adjust the transmit power of the information sending terminal in the sidelink communication. This can always ensure a relatively good reception effect for the first terminal device to receive information or a signal sent by the information sending terminal, thereby reducing power wastes and improving overall performance of the communications system.

Figure 5:
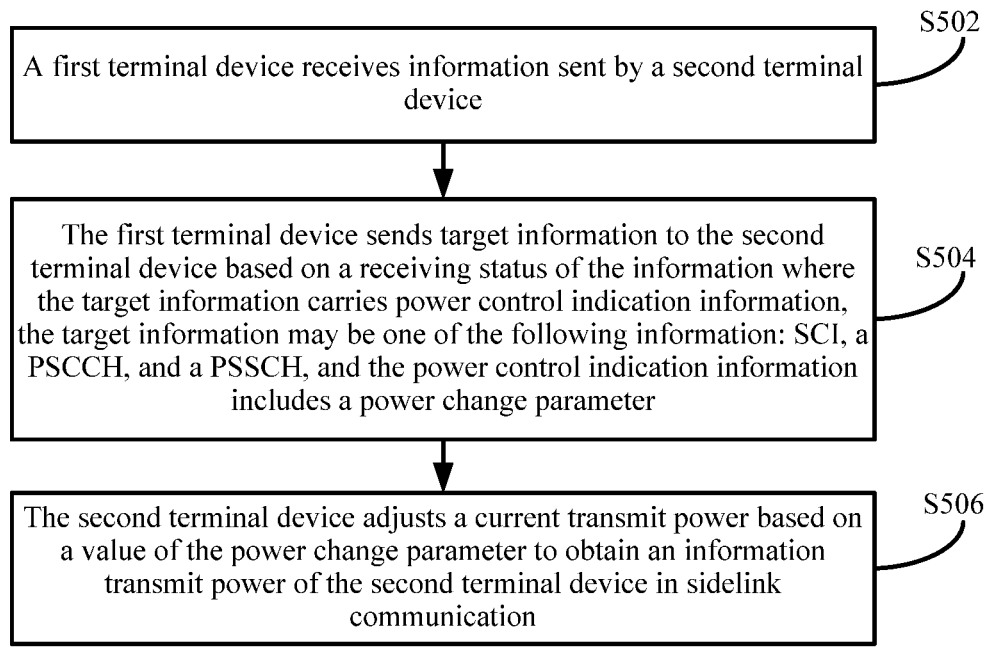
FIG. 5 is still another embodiment of a sidelink power control method according to this disclosure.

As shown in FIG. 5, still another embodiment of this disclosure provides a sidelink power control method. The method may be applied to closed-loop power control processing of sidelink communication. The method may be executed by user equipment. The user equipment may be a terminal device, the terminal device may be a mobile terminal device such as a mobile phone, a tablet computer, or a wearable device, and the terminal device may also be a terminal device such as a personal computer. The terminal device, as an execution body in this embodiment, may include the first terminal device in the foregoing embodiment shown in FIG. 1, that is, may be the terminal device used for information receiving in the sidelink communication, and the second terminal device in the foregoing embodiment shown in FIG. 2, that is, the terminal device used for information sending in the sidelink communication. The method may specifically include steps S502 to S506.

In S502, the first terminal device receives information from the second terminal device.

For a specific processing process of S502, reference may be made to related content in S104, S302, and S304 in the foregoing embodiments shown in FIG. 1 and FIG. 3. Details are not described herein again.

In S504, the first terminal device sends target information to the second terminal device based on a receiving status of the information. The target information carries the power control indication information, and the target information is one of the following information: sidelink control information SCI, a physical sidelink control channel PSCCH, and a physical sidelink shared channel PSSCH. The power control indication information includes a power change parameter.

The power change parameter may be used to indicate whether to adjust an information transmit power of the second terminal device in the sidelink communication, how to adjust the information transmit power, and how much to be adjusted, and the like.

In implementation, after receiving the information, the first terminal device may compare a receive power of the first terminal device with a preset receive power threshold (which may be specifically a value, a value range, or the like, which is not limited in this embodiment of this disclosure), and may determine, based on a comparison result, whether to adjust the information transmit power of the second terminal device in the sidelink communication. If adjustment is required, the first terminal device may obtain a corresponding power change parameter, use the power change parameter as the power control indication information, include the power control indication information in SCI, a PSCCH, or a PSSCH, and send the power control indication information to the second terminal device. For example, if the receive power of the first terminal device is greater than a preset receive power threshold, the power change parameter is R1; if the receive power of the first terminal device is less than a preset receive power threshold, the power change parameter is R2 or the like. Values of R1 and R2 may be determined based on an actual condition, for example, R2 is a positive number and R1 is a negative number.

It should be noted that, in a processing process of sending the power control indication information to the second terminal device by the first terminal device, the power control indication information may be carried in the SCI, the PSCCH, or the PSSCH in the foregoing manner, or may be sent in a manner other than the foregoing manner, for example, the first terminal device may send the power control indication information to the second terminal device through another channel or path. This is not limited in this embodiment of this disclosure.

The foregoing processing process is merely an optional implementation. In actual application, another implementation may be further included. The following further provides an optional implementation, which may specifically include the following content: A value of the power change parameter is a difference between the preset receive power threshold of the first terminal device and the receive power of the first terminal device.

The preset receive power threshold of the first terminal device is determined based on higher-layer configuration information, or determined according to a preset protocol, or predefined. With the receive power corresponding to the preset receive power threshold of the first terminal device, a relatively good reception effect can be ensured for the first terminal device.

To reflect a positive or negative relationship of the power change parameter, the difference may be calculated as follows: The value of the power change parameter is equal to the preset receive power threshold of the first terminal device minus the receive power of the first terminal device.

For example, if the receive power of the first terminal device is 1 dBm and the preset receive power threshold of the first terminal device set in the sidelink communication is 5 dBm, the first terminal device may obtain the power change parameter F=5 dBm−1 dBm=4 dBm.

In S506, the second terminal device adjusts a current transmit power based on the value of the power change parameter to obtain the information transmit power of the second terminal device in the sidelink communication.

In implementation, the second terminal device may receive the power control indication information sent by the first terminal device by using the SCI, PSCCH, PSSCH, or the like. Then, the second terminal device may analyze the power control indication information, and may extract the power change parameter from the power control indication information. The second terminal device may adjust the current transmit power of the second terminal device to ensure that the first terminal device in the side-link communication has a better information reception effect. Specifically, the current transmit power of the second terminal device may be increased or decreased by the value of the power change parameter. Whether to increase or decrease may be determined based on a relationship between the receive power of the first terminal device and the preset receive power threshold of the first terminal device, or may be determined based on a positive or negative value obtained by subtracting the receive power of the first terminal device from the preset receive power threshold of the first terminal device. For example, if the receive power of the first terminal device is less than the preset receive power threshold of the first terminal device, the current transmit power of the second terminal device may be increased by the value of the power change parameter; if the receive power of the first terminal device is greater than the preset receive power threshold of the first terminal device, the current transmit power of the second terminal device may be decreased by the value of the power change parameter. Based on the foregoing example of S504, the receive power of the first terminal device is 1 dBm, the preset receive power threshold, set in the sidelink communication, of the first terminal device is 5 dBm, and the power change parameter F=5 dBm−1 dBm=4 dBm. Then, the information transmit power of the second terminal device in the sidelink communication is the current transmit power of the second terminal device plus the power change parameter 4 dBm. Then, the second terminal device may send information, a signal, or the like at the transmit power obtained by increasing 4 dBm.

In addition, the second terminal device may have a plurality of power control processes, and each power control process may correspond to one transmit power. In this way, in the foregoing case of the power change parameter, each power control process has one power change parameter corresponding to the power control process, and then a specific processing process of the foregoing S506 may include the following steps 1 and 2.

Step 1: Determine, based on a value of the power change parameter corresponding to each power control process, a transmit power corresponding to the power control process.

In implementation, for any one of the plurality of power control processes, the transmit power corresponding to the power control process may be calculated based on a value of the power change parameter corresponding to the power control process by performing the foregoing processing process. For details, reference may be made to the foregoing related content. Details are not described herein again.

Step 2: Determine the information transmit power of the terminal device according to a power determining rule and based on transmit powers corresponding to the plurality of power control processes, where the power determining rule is used to select one or more transmit powers from the transmit powers corresponding to the plurality of power control processes, so as to determine the information transmit power of the second terminal device in the sidelink communication.

In implementation, specific content of the power determining rule may be determined based on an actual condition, which is not limited in this embodiment of this disclosure. In actual application, the processing manner in the foregoing step 2 may include a plurality of manners. The following provides two feasible processing manners, which may specifically include:

Manner 1: After each of the plurality of power control processes of the second terminal device in the sidelink communication obtains a corresponding transmit power through calculation, a transmit power with a maximum value in the transmit powers corresponding to the plurality of power control processes may be selected as the information transmit power of the second terminal device in the sidelink communication; or a transmit power with a second maximum value in the transmit powers corresponding to the plurality of power control processes may be selected as the information transmit power of the second terminal device in the sidelink communication; or a transmit power of a third maximum value may be selected as the information transmit power of the second terminal device in the sidelink communication. Alternatively, a transmit power may be selected randomly from the transmit powers corresponding to the plurality of power control processes as the information transmit power of the second terminal device in the sidelink communication; or a transmit power in a preset value range may be selected from the transmit powers corresponding to the plurality of power control processes as the information transmit power of the second terminal device in the sidelink communication.

Manner 2: After each of the plurality of power control processes in the second terminal device in the sidelink communication obtains a corresponding transmit power through calculation, a plurality of transmit powers greater than a specified value may be selected from the transmit powers corresponding to the plurality of power control processes; or a plurality of transmit powers less than a specified value may be selected from the transmit powers corresponding to the plurality of power control processes; or a plurality of transmit powers within a preset value range may be selected from the transmit powers corresponding to the plurality of power control processes, and the selected plurality of transmit powers may be processed, for example, a numerical average value or geometric average value of the plurality of transmit powers may be calculated, and the processed value may be used as the information transmit power of the second terminal device in the sidelink communication.

It should be noted that each power control process in the second terminal device in the sidelink communication is in a mapping association relationship with a bandwidth part BWP and a resource pool. With the mapping association relationship, each power control process in the second terminal device in the sidelink communication has an actual carrier. In addition, in a case in which the plurality of power control processes are included, there may also be a plurality of the preset receive power thresholds in the first terminal device. Specifically, if one of the plurality of power control processes is set as a first power control process, a preset receive power threshold of the first terminal device for the first power control process may be determined based on a BWP and a resource pool in that are in a mapping association relationship with the first power control process.

In 5G network communication, a maximum bandwidth of 400 MHz can be supported, and a value of the bandwidth is far greater than a maximum bandwidth of 20 MHz in LTE network communication. Therefore, larger system and user throughputs can be supported in 5G network communication. However, supporting the bandwidth of 400 MHz is a great challenge to the terminal devices. The bandwidth of 400 MHz is not easy to implement on low-cost terminal devices. Therefore, 5G network communication also supports a dynamic and flexible bandwidth allocation mechanism. The bandwidth may be divided into a plurality of parts (that is, BWP) to support narrowband terminal devices or energy-efficient terminal devices in accessing the communications networks. BWP-related design conclusions in 5G network communication are as follows:

(1) One terminal device may be configured with one or more BWPs.

When the terminal device is configured with a plurality of BWPs, each BWP may use a same or different numeric logic (that is, Numerologies, also referred to as a parameter set or parameter setting).

(2) A downlink (DL) BWP and uplink (UL) BWP of a terminal device may be separately configured by a network-side device.

(3) Only one DL BWP and one UL BWP are activated for the terminal device at a same moment.

(4) The terminal device may perform dynamic BWP adjustment based on an indication of L1 signaling, including:

Case 1: A center frequency of the BWP remains unchanged, and a BWP bandwidth changes.

Case 2: A center frequency of the BWP changes, and a BWP bandwidth remains unchanged.

Case 3: A center frequency of the BWP changes, and a BWP bandwidth changes.

This embodiment of this disclosure provides a sidelink power control method, applied to a terminal device. The terminal device may be an information sending terminal in the sidelink communication, and receives the power control indication information sent by the first terminal device acting as the information receiving terminal in the sidelink communication, so as to determine the information transmit power of the terminal device (that is, the information sending terminal) in the sidelink communication. In this way, the terminal device can perform closed-loop power control by using the power control indication information in the sidelink communication, so as to further adjust the transmit power of the information sending terminal in the sidelink communication. This can always ensure a relatively good reception effect for the first terminal device to receive information or a signal sent by the information sending terminal, thereby reducing power wastes and improving overall performance of the communications system.

Figure 6:
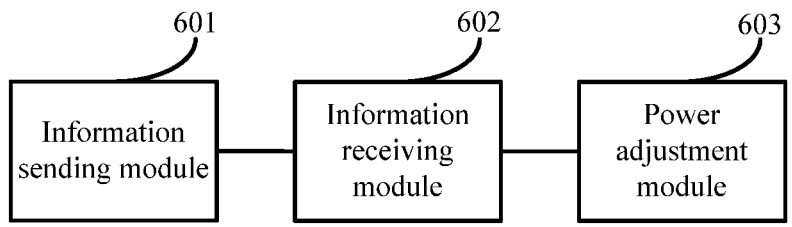
FIG. 6 is an embodiment of a terminal device according to this disclosure.

The foregoing describes the sidelink power control method provided in the embodiments of this disclosure. Based on the same concept, an embodiment of this disclosure further provides a terminal device, as shown in FIG. 6.

The terminal device may be the second terminal device in the foregoing embodiment. The terminal device may include an information sending module 601, an information receiving module 602, and a power adjustment module 603.

The information sending module 601 is configured to send information to a first terminal device in sidelink communication, so that the first terminal device generates power control indication information based on a receiving status of the information;

The information receiving module 602 is configured to receive the power control indication information from the first terminal device.

The power adjustment module 603 is configured to determine an information transmit power of the terminal device in the sidelink communication according to the power control indication information.

In this embodiment of this disclosure, the information receiving module 602 is configured to receive target information from the first terminal device, the target information carries the power control indication information, and the target information is one of the following information: sidelink control information SCI, a physical sidelink control channel PSCCH, and a physical sidelink shared channel PSSCH.

In this embodiment of this disclosure, the power control indication information includes one or a combination of the following: a hybrid automatic repeat request acknowledgment/negative acknowledgment HARQ ACK/NACK, a channel quality indicator CQI, a signal-to-noise ratio SINR, and a block error rate BLER.

In this embodiment of this disclosure, the power adjustment module 603 is configured to determine the information transmit power of the terminal device in the sidelink communication based on a quantity of pieces of the received power control indication information and a total quantity of the terminal devices and the first terminal devices.

In this embodiment of this disclosure, the power control indication information includes a HARQ ACK/NACK.

The power adjustment module 603 is configured to determine, based on a first threshold and a proportion of the HARQ NACKs to a sum of the HARQ ACKs and the HARQ NACKs, the information transmit power of the terminal device in the sidelink communication, where the first threshold is determined based on higher-layer configuration information, or determined according to a preset protocol, or predefined.

In this embodiment of this disclosure, the power control indication information includes a CQI.

The power adjustment module 603 is configured to determine, based on a magnitude relationship between the CQI and an expected CQI, the information transmit power of the terminal device in the sidelink communication, where the expected CQI is determined based on higher-layer configuration information, or determined according to a preset protocol, or predefined.

In this embodiment of this disclosure, the power control indication information includes a power change parameter.

The power adjustment module 603 is configured to adjust a current transmit power based on a value of the power change parameter to obtain the information transmit power of the terminal device in the sidelink communication.

In this embodiment of this disclosure, the value of the power change parameter is a difference between a preset receive power threshold of the first terminal device and a receive power of the first terminal device, and the preset receive power threshold of the first terminal device is determined based on higher-layer configuration information, or determined according to a preset protocol, or predefined.

In this embodiment of this disclosure, the terminal device includes a plurality of power control processes.

The power adjustment module 603 is configured to: determine, based on a value of the power change parameter corresponding to each power control process, a transmit power corresponding to the power control process; and determine the information transmit power of the terminal device according to a power determining rule and based on transmit powers corresponding to the plurality of power control processes, where the power determining rule is used to select one or more transmit powers from the transmit powers corresponding to the plurality of power control processes, so as to determine the information transmit power of the terminal device.

In this embodiment of this disclosure, each power control process is in a mapping association relationship with a bandwidth portion BWP and a resource pool; a preset receive power threshold of the first terminal device on a first power control process is determined by a BWP and a resource pool that are in a mapping association relationship with the first power control process; and the first power control process is one of the plurality of power control processes.

This embodiment of this disclosure provides a terminal device. The terminal device may be an information sending terminal in the sidelink communication, and receives the power control indication information sent by the first terminal device acting as the information receiving terminal in the sidelink communication, so as to determine the information transmit power of the terminal device (that is, the information sending terminal) in the sidelink communication. In this way, the terminal device can perform closed-loop power control by using the power control indication information in the sidelink communication, so as to further adjust the transmit power of the information sending terminal in the sidelink communication. This can always ensure a relatively good reception effect for the first terminal device to receive information or a signal sent by the information sending terminal, thereby reducing power wastes and improving overall performance of the communications system.

Figure 7:
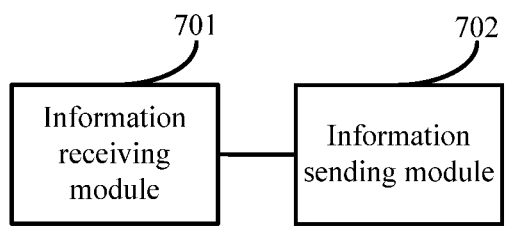
FIG. 7 is another embodiment of a terminal device according to this disclosure.

Based on the same concept, an embodiment of this disclosure further provides a terminal device, as shown in FIG. 7.

The terminal device may be the first terminal device in the foregoing embodiment. The terminal device may include an information receiving module 701 and an information sending module 702.

The information receiving module 701 is configured to receive information from a second terminal device in sidelink communication.

The information sending module 702 is configured to send power control indication information to the second terminal device based on a receiving status of the information, so that the second terminal device determines an information transmit power of the second terminal device in the sidelink communication according to the power control indication information.

In this embodiment of this disclosure, the information sending module 702 is configured to send target information to the second terminal device. The target information carries the power control indication information, and the target information is one of the following information: sidelink control information SCI, a physical sidelink control channel PSCCH, and a physical sidelink shared channel PSSCH.

In this embodiment of this disclosure, the power control indication information includes one or a combination of the following: a hybrid automatic repeat request acknowledgment/negative acknowledgment HARQ ACK/NACK, a channel quality indicator CQI, a signal-to-noise ratio SINR, and a block error rate BLER.

In this embodiment of this disclosure, the power control indication information includes a power change parameter, and the power change parameter is used to determine the information transmit power of the second terminal device in the sidelink communication.

This embodiment of this disclosure provides a terminal device. The terminal device may be an information receiving terminal in the sidelink communication, and sends the power control indication information to the second terminal device acting as the information sending terminal in the sidelink communication, so that the second terminal device determines the information transmit power of the information sending terminal in the sidelink communication. In this way, the terminal device can perform closed-loop power control by using the power control indication information in the sidelink communication, so as to further adjust the transmit power of the information sending terminal in the sidelink communication. This can always ensure a relatively good reception effect for the first terminal device to receive information or a signal sent by the information sending terminal, thereby reducing power wastes and improving overall performance of the communications system.

Figure 8:
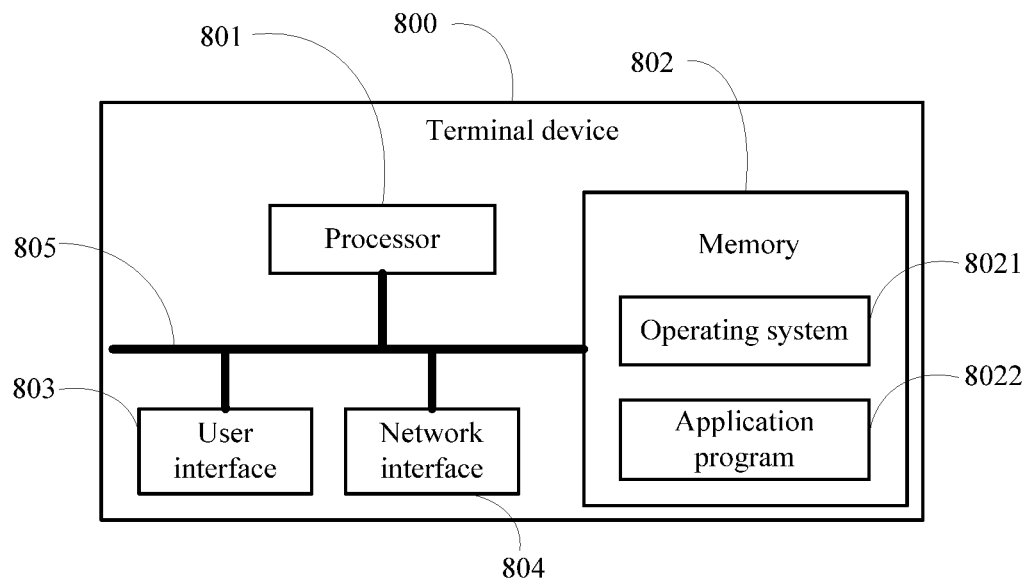
FIG. 8 is still another embodiment of a terminal device according to this disclosure.

FIG. 8 is a block diagram of a terminal device according to another embodiment of this disclosure. The terminal device 800 shown in FIG. 8 includes at least one processor 801, a memory 802, at least one network interface 804, and a user interface 803. The components of the terminal device 800 are coupled together by using a bus system 805. It can be understood that the bus system 805 is configured to implement connection communication between these components. The bus system 805 may include not only a data bus but also a power supply bus, a control bus, and a status signal bus. However, for clear description, various buses in FIG. 8 are marked as the bus system 805.

The user interface 803 may include display, a keyboard, or a pointing device (for example, a mouse, a trackball (trackball), a touch panel, or a touchscreen).

It can be understood that the memory 802 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAM can be used, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct Rambus random access memory (DRRAM). The memory 802 in the terminal device 800 described in the embodiments of this disclosure is intended to include but is not limited to these and any other appropriate types of memories.

In some implementations, the memory 802 stores the following elements: executable modules or data structures, or a subset thereof, or an extended set thereof: an operating system 8021 and an application program 8022.

The operating system 8021 includes various system programs, such as a framework layer, a kernel library layer, and a driver layer, for implementing various basic services and processing hardware-based tasks. The application program 8022 includes various application programs, such as a media player, and a browser, which are used to implement various application services. A program for implementing the method of the embodiments of this disclosure may be included in the application program 8022.

In this embodiment of this disclosure, the terminal device 800 further includes a computer program stored in the memory 805 and configured to run on the processor 801. When being executed by the processor 801, the computer program implements the following steps:

sending information to a first terminal device in sidelink communication, so that the first terminal device generates power control indication information based on a receiving status of the information;

receiving the power control indication information from the first terminal device; and determining information transmit power of the terminal device in sidelink communication according to the power control indication information.

The methods disclosed in the embodiments of this disclosure are applicable to the processor 801, or are implemented by the processor 801. The processor 801 may be an integrated circuit chip with a signal processing capability. During implementation, the steps of the method can be completed by hardware integrated logic circuits in the processor 801 or instructions in the form of software. The processor 801 may be a general-purpose processor, a digital signal processor (DSP), an application-specific integrated circuit (ASIC), a field programmable gate array (FPGA) or another programmable logical device, a discrete gate or transistor logical device, or a discrete hardware component. The processor 801 may implement or execute the methods, steps, and logical block diagrams disclosed in the embodiments of this disclosure. The general-purpose processor may be a microprocessor, or the processor may also be any conventional processor or the like. The steps of the methods disclosed with reference to the embodiments of this disclosure may be directly executed and completed by a hardware decoding processor, or executed and completed by a combination of hardware and software modules in a decoding processor. The software module may be located in a computer-readable storage medium mature in the art, such as a random access memory, a flash memory, a read-only memory, a programmable read-only memory, or an electrically erasable programmable memory, or a register. The computer-readable storage medium is located in the memory 802, and the processor 801 fetches information in the memory 802 and completes the steps of the foregoing method in combination with its hardware. Specifically, the computer-readable storage medium stores a computer program, and the computer program is executed by the processor 801, the steps in the sidelink power control method are implemented.

It can be understood that the embodiments described in this disclosure may be implemented by hardware, software, firmware, middleware, microcode, or a combination thereof. For hardware implementation, the processor can be implemented in one or more application-specific integrated circuits (ASIC), digital signal processors (DSP), digital signal processing devices (DSPD), programmable logic devices (PLD), field-programmable gate arrays (FPGA), general-purpose processors, microcontrollers, microprocessors, other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented inside or outside the processor.

Optionally, the receiving the power control indication information from the first terminal device includes:

receiving target information from the first terminal device, where the target information carries the power control indication information, and the target information is one of the following information: sidelink control information SCI, a physical sidelink control channel PSCCH, and a physical sidelink shared channel PSSCH.

Optionally, the power control indication information includes one or a combination of the following: a hybrid automatic repeat request acknowledgment/negative acknowledgment HARQ ACK/NACK, a channel quality indicator CQI, a signal-to-noise ratio SINR, and a block error rate BLER.

Optionally, the determining an information transmit power of the terminal device in the sidelink communication according to the power control indication information includes:

determining the information transmit power of the terminal device in the sidelink communication based on a quantity of pieces of the received power control indication information and a total quantity of the terminal devices and the first terminal devices.

Optionally, the power control indication information includes the HARQ ACK/NACK.

The determining an information transmit power of the terminal device in the sidelink communication according to the power control indication information includes:

determining, based on a first threshold and a proportion of the HARQ NACKs to a sum of the HARQ ACKs and the HARQ NACKs, the information transmit power of the terminal device in the sidelink communication, where the first threshold is determined based on higher-layer configuration information, or determined according to a preset protocol, or predefined.

Optionally, the power control indication information includes the CQI.

The determining an information transmit power of the terminal device in the sidelink communication according to the power control indication information includes:

determining, based on a magnitude relationship between the CQI and an expected CQI, the information transmit power of the terminal device in the sidelink communication, where the expected CQI is determined based on higher-layer configuration information, or determined according to a preset protocol, or predefined.

Optionally, the power control indication information includes a power change parameter.

The determining an information transmit power of the terminal device in the sidelink communication according to the power control indication information includes:

adjusting a current transmit power based on a value of the power change parameter to obtain the information transmit power of the terminal device in the sidelink communication.

Optionally, the value of the power change parameter is a difference between a preset receive power threshold of the first terminal device and a receive power of the first terminal device, and the preset receive power threshold of the first terminal device is determined based on higher-layer configuration information, or determined according to a preset protocol, or predefined.

Optionally, the terminal device includes a plurality of power control processes.

The adjusting a current transmit power based on a value of the power change parameter to obtain the information transmit power of the terminal device in the sidelink communication includes:

determining, based on a value of the power change parameter corresponding to each power control process, a transmit power corresponding to the power control process; and determining the information transmit power of the terminal device according to a power determining rule and based on transmit powers corresponding to the plurality of power control processes, where the power determining rule is used to select one or more transmit powers from the transmit powers corresponding to the plurality of power control processes, so as to determine the information transmit power of the terminal device.

Optionally, each power control process is in a mapping association relationship with a bandwidth portion BWP and a resource pool. A preset receive power threshold of the first terminal device on a first power control process is determined by a BWP and a resource pool that are in a mapping association relationship with the first power control process. The first power control process is one of the plurality of power control processes.

The terminal device 800 is capable of implementing each process implemented by the terminal device in the foregoing embodiments. To avoid repetition, details are not described herein again.

This embodiment of this disclosure provides a terminal device. The terminal device may be an information sending terminal in the sidelink communication, and receives the power control indication information sent by the first terminal device acting as the information receiving terminal in the sidelink communication, so as to determine the information transmit power of the terminal device (that is, the information sending terminal) in the sidelink communication. In this way, the terminal device can perform closed-loop power control by using the power control indication information in the sidelink communication, so as to further adjust the transmit power of the information sending terminal in the sidelink communication. This can always ensure a relatively good reception effect for the first terminal device to receive information or a signal sent by the information sending terminal, thereby reducing power wastes and improving overall performance of the communications system.

Figure 9:
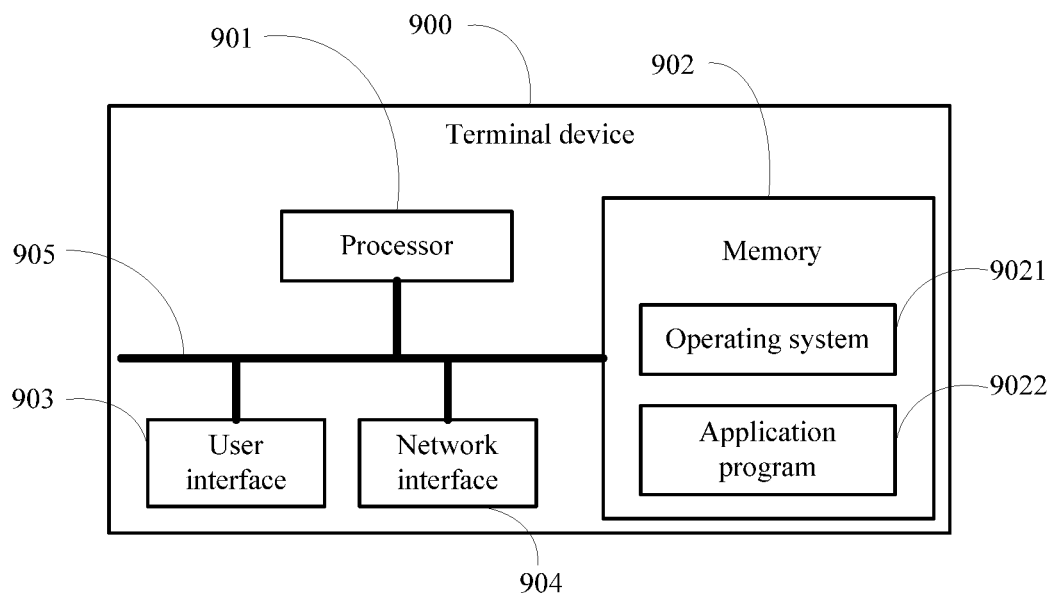
FIG. 9 is still another embodiment of a terminal device according to this disclosure.

FIG. 9 is a block diagram of a terminal device according to another embodiment of this disclosure. The terminal device 900 shown in FIG. 9 includes at least one processor 901, a memory 902, at least one network interface 904, and a user interface 903. The components of the terminal device 900 are coupled together by using a bus system 905. It can be understood that the bus system 905 is configured to implement connection communication between these components. The bus system 905 may include not only a data bus but also a power supply bus, a control bus, and a status signal bus. However, for clear description, various buses in FIG. 9 are marked as the bus system 905.

The user interface 903 may include a display, a keyboard, a click device (for example, a mouse or a trackball (trackball)), a touch board, or a touchscreen.

It can be understood that the memory 902 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAM can be used, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct Rambus random access memory (DRRAM). The memory 902 in the system and method described in the embodiments of this disclosure is intended to include but is not limited to these and any other appropriate types of memories.

In some implementations, the memory 902 stores the following elements: an executable module or a data structure, or a subset thereof, or an extended set thereof: an operating system 9021 and an application program 9022.

The operating system 9021 includes various system programs, such as a framework layer, a kernel library layer, and a driver layer, which are used to implement various basic services and process hardware-based tasks. The application program 9022 includes various application programs, such as a media player, and a browser, which are used to implement various application services. A program that implements the methods of the embodiments of this disclosure may be included in the application program 9022.

In this embodiment of this disclosure, the terminal device 900 further includes a computer program stored in the memory 905 and configured to run on the processor 901. When being executed by the processor 901, the computer program implements the following steps:

receiving information from a second terminal device in sidelink communication; and sending power control indication information to the second terminal device based on a receiving status of the information, so that the second terminal device determines an information transmit power of the second terminal device in the sidelink communication according to the power control indication information.

The methods disclosed in the embodiments of this disclosure are applicable to the processor 901, or are implemented by the processor 901. The processor 901 may be an integrated circuit chip with a signal processing capability. During implementation, the steps of the methods may be implemented by an integrated logical circuit of hardware in the processor 901, or by using a software instruction. The processor 901 may be a general-purpose processor, a digital signal processor (DSP), an application-specific integrated circuit (ASIC), a field programmable gate array (FPGA) or another programmable logical device, a discrete gate or transistor logical device, or a discrete hardware component. The processor 901 may implement or execute the methods, steps, and logical block diagrams disclosed in the embodiments of this disclosure. The general-purpose processor may be a microprocessor, or the processor may also be any conventional processor or the like. The steps of the methods disclosed with reference to the embodiments of this disclosure may be directly implemented by a hardware decoding processor, or may be implemented by a combination of hardware and software modules in a decoding processor. The software module may be located in a computer-readable storage medium that is mature in the art, such as a random access memory, a flash memory, a read-only memory, a programmable read-only memory, or an electrically erasable programmable memory, or a register. The computer-readable storage medium is located in the memory 902, and the processor 901 reads information in the memory 902 and implements, in combination with its hardware, the steps of the foregoing methods. Specifically, the computer-readable storage medium stores a computer program, and the computer program is executed by the processor 901 to implement the steps of the selection method embodiments of the network unit.

It can be understood that the embodiments described in this disclosure may be implemented by hardware, software, firmware, middleware, microcode, or a combination thereof. For hardware implementation, processing units can be implemented in one or more application specific integrated circuits (ASIC), digital signal processors (DSP), digital signal processing devices (DSPD), programmable logic devices (PLD), field-programmable gate arrays (FPGA), general-purpose processors, microcontrollers, microprocessors, other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented inside or outside the processor.

The sending the power control indication information to the second terminal device includes:

sending target information to the second terminal device, where the target information carries the power control indication information, and the target information is one of the following information: sidelink control information SCI, a physical sidelink control channel PSCCH, and a physical sidelink shared channel PSSCH.

Optionally, the power control indication information includes one or a combination of the following: a hybrid automatic repeat request acknowledgment/negative acknowledgment HARQ ACK/NACK, a channel quality indicator CQI, a signal-to-noise ratio SINR, and a block error rate BLER.

Optionally, the power control indication information includes a power change parameter, and the power change parameter is used to determine the information transmit power of the second terminal device in the sidelink communication.

The terminal device 900 is capable of implementing each process implemented by the terminal device in the foregoing embodiments. To avoid repetition, details are not described herein again.

This embodiment of this disclosure provides a terminal device. The terminal device may be an information receiving terminal in the sidelink communication, and sends the power control indication information to the second terminal device acting as the information sending terminal in the sidelink communication, so that the second terminal device determines the information transmit power of the information sending terminal in the sidelink communication. In this way, the information transmit power of the information sending terminal in the sidelink communication can be accurately controlled by using the power control indication information fed back by the information receiving terminal. This can always ensure a relatively good reception effect for the first terminal device to receive information or a signal sent by the information sending terminal, to implement closed-loop power control for the sidelink communication, thereby improving an information or signal reception effect of the information receiving terminal.

Based on the same concept, an embodiment of this disclosure further provides a computer-readable storage medium.

The computer-readable storage medium stores one or more programs. When being executed by the terminal device that includes a plurality of application programs to perform the processing process shown in FIG. 1, FIG. 2, FIG. 4, and FIG. 5, the one or more programs enable the terminal device to perform the following operations:

sending information to a first terminal device in sidelink communication, so that the first terminal device generates power control indication information based on a receiving status of the information;

receiving the power control indication information from the first terminal device; and determining information transmit power of the terminal device in sidelink communication according to the power control indication information.

Optionally, the receiving the power control indication information from the first terminal device includes:

receiving target information from the first terminal device, where the target information carries the power control indication information, and the target information is one of the following information: sidelink control information SCI, a physical sidelink control channel PSCCH, and a physical sidelink shared channel PSSCH.

Optionally, the power control indication information includes one or a combination of the following: a hybrid automatic repeat request acknowledgment/negative acknowledgment HARQ ACK/NACK, a channel quality indicator CQI, a signal-to-noise ratio SINR, and a block error rate BLER.

Optionally, the determining an information transmit power of the terminal device in the sidelink communication according to the power control indication information includes:

determining the information transmit power of the terminal device in the sidelink communication based on a quantity of pieces of the received power control indication information and a total quantity of the terminal devices and the first terminal devices.

Optionally, the power control indication information includes the HARQ ACK/NACK.

The determining an information transmit power of the terminal device in the sidelink communication according to the power control indication information includes:

determining, based on a first threshold and a proportion of the HARQ NACKs to a sum of the HARQ ACKs and the HARQ NACKs, the information transmit power of the terminal device in the sidelink communication, where the first threshold is determined based on higher-layer configuration information, or determined according to a preset protocol, or predefined.

Optionally, the power control indication information includes the CQI.

The determining an information transmit power of the terminal device in the sidelink communication according to the power control indication information includes:

determining, based on a magnitude relationship between the CQI and an expected CQI, the information transmit power of the terminal device in the sidelink communication, where the expected CQI is determined based on higher-layer configuration information, or determined according to a preset protocol, or predefined.

Optionally, the power control indication information includes a power change parameter.

The determining an information transmit power of the terminal device in the sidelink communication according to the power control indication information includes:

adjusting a current transmit power based on a value of the power change parameter to obtain the information transmit power of the terminal device in the sidelink communication.

Optionally, the value of the power change parameter is a difference between a preset receive power threshold of the first terminal device and a receive power of the first terminal device, and the preset receive power threshold of the first terminal device is determined based on higher-layer configuration information, or determined according to a preset protocol, or predefined.

Optionally, the terminal device includes a plurality of power control processes.

The adjusting a current transmit power based on a value of the power change parameter to obtain the information transmit power of the terminal device in the sidelink communication includes:

determining, based on a value of the power change parameter corresponding to each power control process, a transmit power corresponding to the power control process; and determining the information transmit power of the terminal device according to a power determining rule and based on transmit powers corresponding to the plurality of power control processes, where the power determining rule is used to select one or more transmit powers from the transmit powers corresponding to the plurality of power control processes, so as to determine the information transmit power of the terminal device.

Optionally, each power control process is in a mapping association relationship with a bandwidth portion BWP and a resource pool. A preset receive power threshold of the first terminal device on a first power control process is determined by a BWP and a resource pool that are in a mapping association relationship with the first power control process. The first power control process is one of the plurality of power control processes.

In addition, the computer-readable storage medium stores one or more programs. When being executed by the terminal device that includes a plurality of application programs to perform the processing process shown in FIG. 3 to FIG. 5, the one or more programs enable the terminal device to perform the following operations:

receiving information from a second terminal device in sidelink communication; and sending power control indication information to the second terminal device based on a receiving status of the information, so that the second terminal device determines an information transmit power of the second terminal device in the sidelink communication according to the power control indication information.

Optionally, the sending the power control indication information to the second terminal device includes:

sending target information to the second terminal device, where the target information carries the power control indication information, and the target information is one of the following information: sidelink control information SCI, a physical sidelink control channel PSCCH, and a physical sidelink shared channel PSSCH.

Optionally, the power control indication information includes one or a combination of the following: a hybrid automatic repeat request acknowledgment/negative acknowledgment HARQ ACK/NACK, a channel quality indicator CQI, a signal-to-noise ratio SINR, and a block error rate BLER.

Optionally, the power control indication information includes a power change parameter, and the power change parameter is used to determine the information transmit power of the second terminal device in the sidelink communication.

This embodiment of the disclosure provides a computer-readable storage medium. The information sending terminal in the sidelink communication receives the power control indication information sent by the first terminal device acting as the information receiving terminal in the sidelink communication, so as to determine the information transmit power of the terminal device (that is, the information sending terminal) in the sidelink communication. In this way, the terminal device can perform closed-loop power control by using the power control indication information in the sidelink communication, so as to further adjust the transmit power of the information sending terminal in the sidelink communication. This can always ensure a relatively good reception effect for the first terminal device to receive information or a signal sent by the information sending terminal, thereby reducing power wastes and improving overall performance of the communications system.

In the 1990s, an improvement to a technology could be clearly distinguished between an improvement on hardware (for example, an improvement to a circuit structure such as a diode, a transistor, and a switch) or an improvement on software (for method processes). However, with development of technologies, many improvements on the method processes today can be considered as direct improvements on a hardware circuit structure. Designers almost always obtain a corresponding hardware circuit structure by programming an improved method process into a hardware circuit. Therefore, this does not mean that the improvement on the method process cannot be implemented by a hardware entity module. For example, a programmable logic device (PLD) (for example, a field programmable gate array (FPGA)) is such an integrated circuit whose logic function is determined by component programming by a user. The designers perform programming to "integrate" a digital system into a PLD, with no need to ask a chip manufacturer to design and manufacture a dedicated integrated circuit chip. Nowadays, in place of manual fabrication of integrated circuit chips, such programming is mostly implemented by using "logic compiler (logic compiler)" software, which is similar to a software compiler used for writing during program development, and the original code to be compiled is also written in a specific programming language called a hardware description language (HDL). There is not only one HDL, but many HDLs, for example, ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). Currently, VHDL (Very-High-Speed Integrated Circuit Hardware Description Language) and Verilog are most commonly used. Persons skilled in the art should also be aware that the method process merely needs to be programmed into the integrated circuit through logic programming by using the foregoing several hardware description languages, to easily obtain the hardware circuit for implementing the logical method process.

The controller may be implemented in any proper manner. For example, the controller may be in a form of a microprocessor, a processor, or a computer-readable medium storing computer-readable program code (such as software or firmware) that can be executed by the (micro)processor, a logic gate, a switch, an application specific integrated circuit (ASIC), a programmable logic controller, or an embedded microcontroller. Examples of the controller include but are not limited to the following microcontrollers: ARC 625D, Atmel AT91SAM, Microchip PIC18F26K20, and Silicone Labs C8051F320. The memory controller may also be implemented as a part of control logic of the memory. Persons skilled in the art also know that, in addition to implementation of the controller in a manner of pure computer-readable program code, logic programming may be performed on the method steps to enable the controller to implement a same function in a form of a logic gate, a switch, an application specific integrated circuit, a programmable logic controller, and an embedded microcontroller. Therefore, the controller can be considered as a hardware component, and apparatuses, included in the controller, for implementing various functions can also be considered as a structure within the hardware component. Alternatively, the apparatus for implementing various functions may be considered as either a software module implementing the method or the structure within the hardware component.

The system, apparatus, module, or unit illustrated in the foregoing embodiments may be specifically implemented by a computer chip or entity, or may be implemented by a product having a function. A typical implementation device is a computer. Specifically, the computer may be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

For ease of description, the apparatus is described by dividing the functions into various units. Certainly, when this disclosure is implemented, the functions of each unit may be implemented in one or more pieces of software and/or hardware.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to the embodiments of this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

In a typical configuration, the computing device includes one or more processors (CPU), an input/output interface, a network interface, and a memory.

The memory may include a form of a non-permanent memory such as a random access memory (RAM) and/or a non-volatile memory such as a read-only memory (ROM) or a flash memory (flash RAM) in computer-readable media. The memory is an example of the computer-readable medium.

Computer-readable media include permanent and non-permanent, removable and non-removable media, and information storage can be implemented by any method or technology. Information may be a computer-readable instruction, a data structure, a program module, or other data. Examples of the storage media of the computer include, but are not limited to, a phase change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disk (DVD) or other optical storage, a magnetic cassette, a magnetic tape storage, other magnetic storage devices, or any other non-transmission media, which can be used to store information that can be accessed by a computing device. As defined in this specification, the computer-readable medium does not include transitory computer-readable media (transitory media), such as a modulated data signal and carrier.

It should be noted that the term s "include", "comprise", or any of their variants is intended to cover a non-exclusive inclusion, so that a process, a method, a commodity, or a device including a set of elements not only includes those elements but also includes other elements that are not expressly listed, or further includes elements inherent to such process, method, commodity, or device. In absence of more constraints, an element preceded by the statement "includes a . . . " does not preclude existence of identical elements in the process, method, commodity, or device that includes the element.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

This disclosure may be described in a general context of computer executable instructions executed by the computer, such as a program module. Generally, the program module includes a routine, a program, an object, a component, a data structure, and the like that execute a specified task or implement a specified abstract data type. This disclosure may alternatively be practiced in distributed computing environments. In the distributed computing environments, tasks are executed by remote processing devices connected through a communication network. In the distributed computing environments, the program modules may be located in local and remote computer storage media including storage devices.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are merely embodiments of this disclosure, but are not intended to limit this disclosure. Persons skilled in the art understand that this disclosure may have various modifications and variations. Any modification, equivalent replacement, and improvement made without departing from the spirit and principle of this disclosure shall fall within the protection scope of the claims of this disclosure.

What is claimed is:

1. A sidelink power control method, applied to a second terminal device and comprising:

sending information to a first terminal device in sidelink communication, so that the first terminal device generates power control indication information based on a receiving status of the information;

receiving the power control indication information from the first terminal device; and determining an information transmit power of the second terminal device in the sidelink communication according to the power control indication information;

wherein:

the second terminal device comprises a plurality of power control processes for the sidelink communication with one or more first terminal devices;

each power control process is in a mapping association relationship with a bandwidth portion (BWP) and a resource pool; and the determining the information transmit power of the second terminal device in the sidelink communication according to the power control indication information comprises:

determining the information transmit power of the second terminal device in the side communication based on a quantity of pieces of the received power control indication information and a total quantity of the second terminal device and the first terminal device in a same sidelink communication.

2. The method according to claim 1, wherein the receiving the power control indication information from the first terminal device comprises:

receiving target information from the first terminal device, wherein:

the target information carries the power control indication information, and the target information is one of the following information:

sidelink control information (SCI), a physical sidelink control channel (PSCCH), and a physical sidelink shared channel (PSSCH).

3. The method according to claim 1, wherein the power control indication information comprises one or a combination of the following:

a hybrid automatic repeat request acknowledgment/negative acknowledgment (HARQ ACK/NACK), a channel quality indicator (CQI), a signal-to-noise ratio (SINR), and a block error rate (BLER).

4. The method according to claim 1, wherein:

the power control indication information comprises a power change parameter; and the determining an information transmit power of the terminal device in the sidelink communication according to the power control indication information comprises:

adjusting a current transmit power based on a value of the power change parameter to obtain the information transmit power of the terminal device in the sidelink communication.

5. The method according to claim 4, wherein:

the value of the power change parameter is a difference between a preset receive power threshold of the first terminal device and a receive power of the first terminal device, and the preset receive power threshold of the first terminal device is determined based on higher-layer configuration information, or determined according to a preset protocol, or predefined.

6. The method according to claim 5, wherein the adjusting a current transmit power based on a value of the power change parameter to obtain the information transmit power of the terminal device in the sidelink communication comprises:

determining, based on a value of the power change parameter corresponding to each power control process, a transmit power corresponding to the power control process; and determining the information transmit power of the terminal device according to a power determining rule and based on transmit powers corresponding to the plurality of power control processes, wherein the power determining rule is used to select one or more transmit powers from the transmit powers corresponding to the plurality of power control processes, so as to determine the information transmit power of the terminal device.

7. A sidelink power control method, applied to a first terminal device and comprising:

receiving information from a second terminal device in sidelink communication; and sending power control indication information to the second terminal device based on a receiving status of the information, so that the second terminal device determines an information transmit power of the second terminal device in the sidelink communication based on a quantity of pieces of the received power control indication information from one or more first terminal devices in communication with the second terminal and a total quantity of the second terminal device and the first terminal device in a sidelink communication;

wherein:

the power control indication information is determined by the first terminal device according to a preset receive power threshold of the first terminal device for a first power control process, the preset receive power threshold of the first terminal device for the first power control process is determined based on a bandwidth portion (BWP) and a resource pool in a mapping association relationship with the first power control process, and the first power control process is one of a plurality of power control processes comprised by the second terminal device, each of the plurality of power control processes is in a mapping association relationship with a BWP and a resource pool.

8. The method according to claim 7, wherein the sending the power control indication information to the second terminal device comprises:

sending target information to the second terminal device, wherein:

the target information carries the power control indication information, and the target information is one of the following information:

sidelink control information (SCI), a physical sidelink control channel (PSCCH), and a physical sidelink shared channel (PSSCH).

9. The method according to claim 7, wherein the power control indication information comprises one or a combination of the following:

a hybrid automatic repeat request acknowledgment/negative acknowledgment (HARQ ACK/NACK), a channel quality indicator (CQI), a signal-to-noise ratio (SINR), and a block error rate (BLER).

10. The method according to claim 7, wherein:
the power control indication information comprises a power change parameter, and
the power change parameter is used to determine the information transmit power of the second terminal device in the sidelink communication.

11. A terminal device, the terminal device being a first terminal device, comprising a memory, a processor, and a program stored in the memory and configured to run on the processor, wherein when the computer program is executed by the processor, the steps of the sidelink power control method according to claim 9 are implemented.

12. The terminal device according to claim 11, wherein when the computer program is executed by the processor, following step is further implemented:
sending target information to the second terminal device, wherein:
the target information carries the power control indication information, and
the target information is one of the following information:
sidelink control information (SCI),
a physical sidelink control channel (PSCCH), and
a physical sidelink shared channel (PSSCH).

13. The terminal device according to claim 11, wherein the power control indication information comprises one or a combination of the following:
a hybrid automatic repeat request acknowledgment/negative acknowledgment (HARQ ACK/NACK),
a channel quality indicator (CQI),
a signal-to-noise ratio (SINR), and
a block error rate (BLER).

14. The terminal device according to claim 11, wherein:
the power control indication information comprises a power change parameter, and
the power change parameter is used to determine the information transmit power of the second terminal device in the sidelink communication.

15. A terminal device, the terminal device being a second terminal device, comprising a memory, a processor, and a program stored in the memory and configured to run on the processor, wherein when the computer program is executed by the processor, following steps are implemented:
sending information to a first terminal device in sidelink communication, so that the first terminal device generates power control indication information based on a receiving status of the information;
receiving the power control indication information from the first terminal device; and
determining an information transmit power of the second terminal device in the sidelink communication according to the power control indication information;
wherein:
the second terminal device comprises a plurality of power control processes for the sidelink communication with one or more first terminal devices;
each power control process is in a mapping association relationship with a bandwidth portion (BWP) and a resource pool; and
the determining the information transmit power of the second terminal device in the sidelink communication according to the power control indication information comprises:
determining the information transmit power of the second terminal device in the sidelink communication based on a quantity of pieces of the received power control indication information and a total quantity of the second terminal device and the first terminal device in a same sidelink communication.

16. The terminal device according to claim 15, wherein when the computer program is executed by the processor, following step is further implemented:
receiving target information from the first terminal device, wherein:
the target information carries the power control indication information, and the target information is one of the following information:
sidelink control information (SCI),
a physical sidelink control channel (PSCCH), and
a physical sidelink shared channel (PSSCH).

17. The terminal device according to claim 15, wherein the power control indication information comprises one or a combination of the following:
a hybrid automatic repeat request acknowledgment/negative acknowledgment (HARQ ACK/NACK),
a channel quality indicator (CQI),
a signal-to-noise ratio (SINR), and
a block error rate (BLER).

\* \* \* \* \*